United States Patent
Kim et al.

(10) Patent No.: US 6,438,269 B1
(45) Date of Patent: Aug. 20, 2002

(54) METHOD FOR MULTI-STEP FILTERING SPATIOUS OBJECTS BY UTILIZING MMP FILTER IN SPATIAL DATABASE SYSTEM

(75) Inventors: Mi Yeon Kim; Sang Kyu Choe; Su Mi Lim; Jang Su Kim, all of Seoul (KR)

(73) Assignee: Korea Telecom, Sungnam-shi (KR)

( * ) Notice: Subject to any disclaimer, the term of this patent is extended or adjusted under 35 U.S.C. 154(b) by 0 days.

(21) Appl. No.: 09/236,403

(22) Filed: Jan. 25, 1999

(30) Foreign Application Priority Data

Jan. 23, 1998 (KR) .............................................. 98-2024

(51) Int. Cl.$^7$ ................................................. G06K 9/46
(52) U.S. Cl. ........................................ 382/261; 382/260
(58) Field of Search .................................. 382/260–269

(56) References Cited

U.S. PATENT DOCUMENTS 5,642,288 A * 6/1997 Leung et al. .......... 364/478.11
6,018,592 A * 1/2000 Shinagawa et al. ......... 395/195

* cited by examiner

*Primary Examiner*—Thomas D. Lee
*Assistant Examiner*—Stephen Brinich
(74) *Attorney, Agent, or Firm*—Staas & Halsey LLP

(57) ABSTRACT

The present invention relates to a method for multi-step filtering a candidate object which is filtered by a minimum bounding rectangle (MBR); and, more particulary, to a method of multi-step filtering a candidate object by employing a minimum maximum point (MMP) filter to improve spatial query filtering process performance by refiltering the candidate objects, which are filtered by using a rotated minimum bounding rectangle (Rotated Minimum Bounding Rectangle) surrounding spatial objects during filtering process at a step of spatial query filtering and refining of spatial database, by using spatial filter, i.e., MMP filter.

7 Claims, 4 Drawing Sheets

METHOD FOR MULTI-STEP FILTERING SPATIOUS OBJECTS BY UTILIZING MMP FILTER IN SPATIAL DATABASE SYSTEM

FIELD OF THE INVENTION

The present invention relates to a method for multi-step filtering a spatial object in a spatial database system; and, more particulary, to a method for multi-step refiltering a candidate object, which is filtered by minimum bounding rectangle (MBR), by employing a minimum maximum point (MMP) filter to improve a performance of spatial query processing performed in filtering and refinement steps.

DESCRIPTION OF THE PRIOR ART

A spatial database system has been generally used for a geographic information system (GIS) involved with managements of resources and facilities, e.g., territory, resources, electricity, telecommunication facility. The GIS has a plurality of data composed of spatial data and non-spatial data, and it consists essentially of millions of spatial objects. One of spatial objects includes geometrical characteristics of an object. The spatial characteristics consist essentially of simple figures, which are made up of points, lines, rectangles, polygons, and complex figures composed of these simple figures. The spatial object having these spatial characteristics is filtered and refined in association with requiry for spatial query during the spatial query processing. The spatial object is managed by a spatial index method, and spatial query processing is processed by using information of spatial index. However, the spatial object which the spatial index should manage is very irregular, and generally consists essentially of a plurality of points, so that the spatial object can not be used rawly as a key of the spatial index.

Therefore, as shown in FIG. 1, a conventional spatial query processing is achieved as follows: at step 10, a minimum bounding rectangle (Minimum Bounding Rectangle:MBR) is extracted in regard to a spatial object; at step 11, a spatial index is constructed by using the Minimum Bounding Rectangle of object extracted at step 10 as a key of the spatial index; at step 12, a spatial query is required by a user in regard to a spatial index key constructed at step 11; at step 13, a candidate object satisfactory to the spatial query is selected by comparing the minimum bounding rectangle (MBR) of a domain object given from the spatial query required at step 12 with the Minimum Bounding Rectangle of the spatial object constructed at step 11; at step 14, it is decided whether a candidate object is selected or not at step 13; at step 14, if a candidate object satisfactory to the spatial query is not selected at step 13, another object is filter-processed while comparing the Minimum Bounding Rectangle of the domain object on demand of the spatial query at step 12 with the Minimum Bounding Rectangle of the non-filter-processed spatial object among the spatial object constructed at step 11, on the other hand, if the candidate object is selected at step 13, at step 15 the object is refinement-processed by comparing a real shape of the selected candidate object with real shape of the domain object given at the spatial query at step 12; at step 16, it is decided whether the object matches the query condition or not; at step 16, if the object does not match the query condition, it goes back to step 13 and steps 13 and 15 are executed repeatedly; and, if the object matches the query, at step 17 it is contained in the satisfied object set.

However, because a filtering ratio of the Minimum Bounding Rectangle at the spatial query processing is low, there may be a problem in that lots of data should be processed at the refinement step at which it takes much time to operate the complex object.

To solve the problem, the method of multi-step filtering is provided, in which the candidate object filtered by using the Minimum Bounding Rectangle is refiltered by using various spatial filters whose ratio is higher than that of the Minimum Bounding Rectangular.

Accordingly, there have been provided various spatial filters surrounding an object, such as a rotated minimum bounding rectangle (RMBR), a minimum bounding circle (MBC), a minimum bounding ellipse (MBE), a minimum bounding convexhull, a minimum bounding n-corner (n-C) which consists of n points, maximum enclosed rectangle (MER) and a maximum enclosed line (MEL) which is the maximum value on x and y axises of the object. However, there is a problem in that these various filters can be generated only in regard to a areal object. Not only the processing of the areal object but also the processing of a linear object is indispensable in spatial database, so the filter considering the linear object and the areal object is minimum maximum point (MMP) filter which exists on the border line of the spatial object and consists of two or four points which have the minimum or the maximum value on x/y axis. This Minimum Maximum Point filter has the low consumption cost for generating or managing the filter, has the small memory space for storage, and has the characteristics that it can be applied not only to the areal object but also to the linear object. However, the method of milti-step filtering by utilizing Minimum Maximum Point filter can be applied to each well-known spatial operator used at the spatial database system is not provided yet.

SUMMARY OF THE INVENTION

It is, therefore, a primary object of the invention to provide a method for multi-step filtering by utilizing minimum maximum point (MMP) filter in a spatial data base system.

In accordance with one aspect of the present invention, there is provided a method of multi-step filtering by utilizing MMP filter in the spatial database system in order to improve performance of spatial query processing by refiltering candidate objects, which are filtered by using a minimum bounding rectangles (MBRs) surrounding spatial objects during the filtering step at spatial query processing by filtering and refinement steps in spatial database system, by using spatial filter, i.e., MMP filter.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, the present invention will be described in detail referring to the accompanying drawings.

Figure 1:
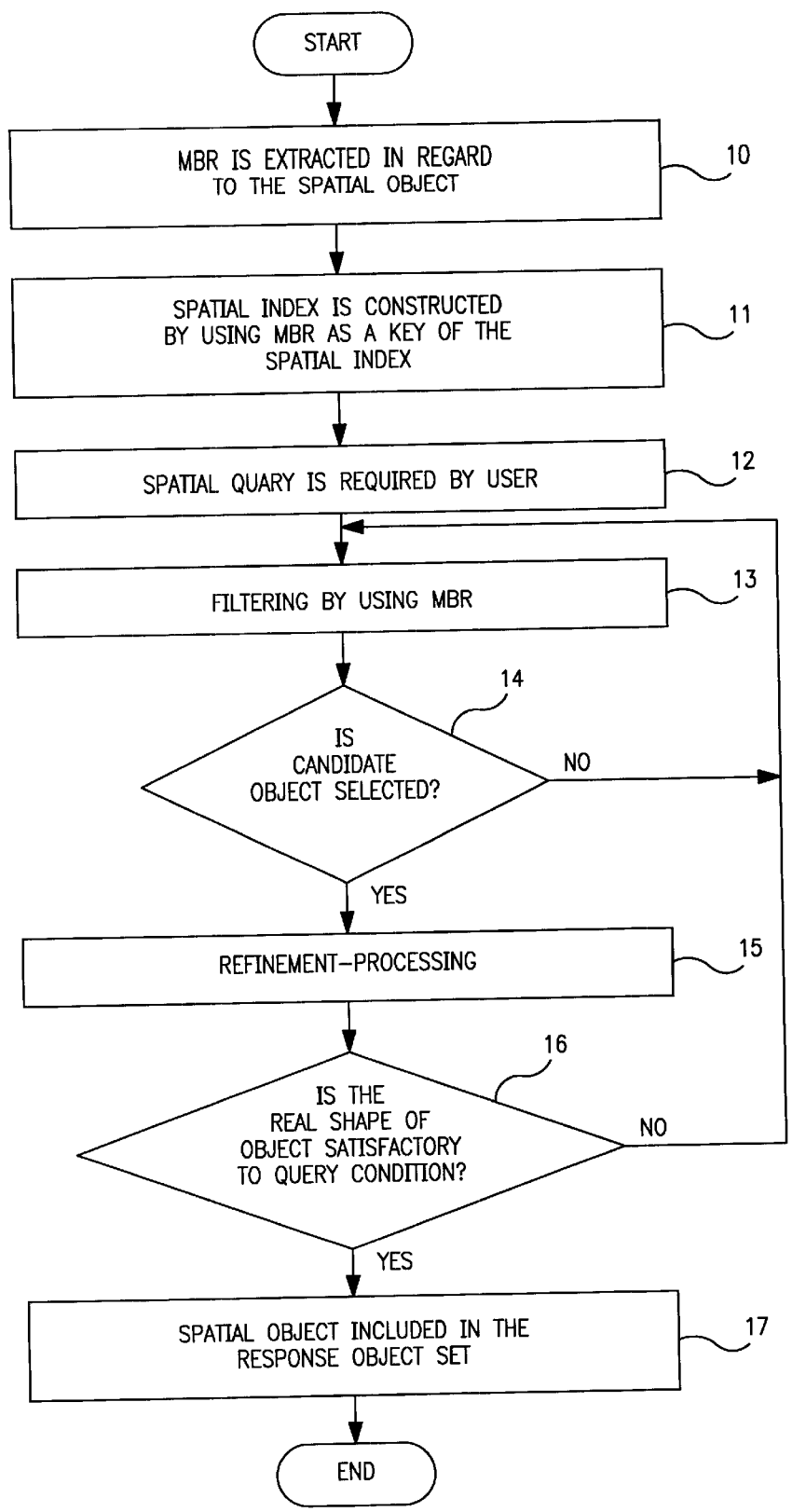
FIG. 1 is a flow chart for a conventional spatial query processing of a spatial database system.
Figure 2:
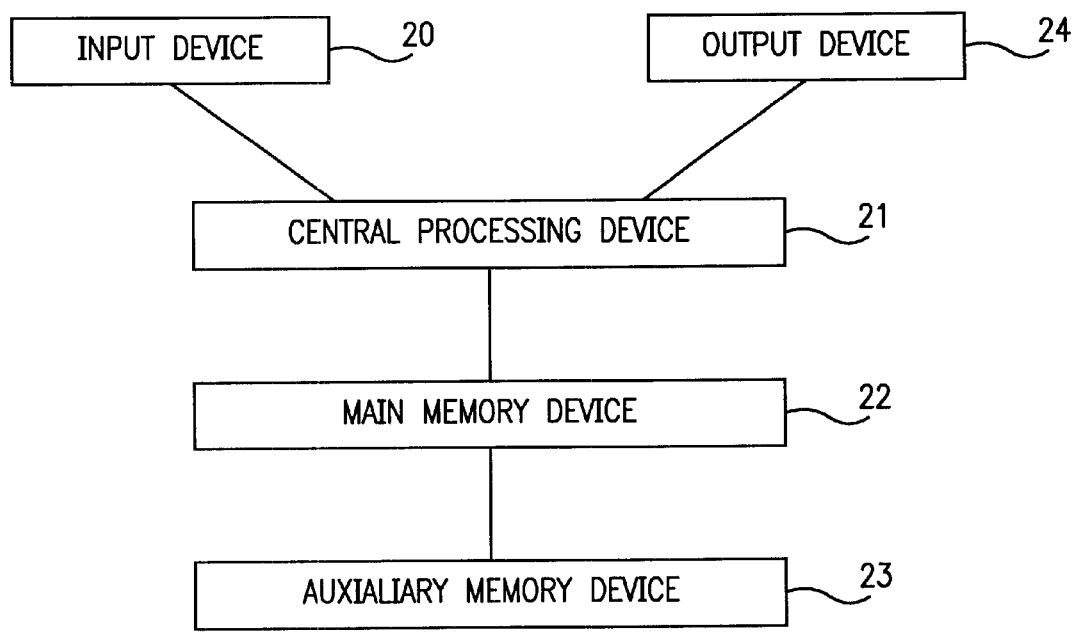
FIG. 2 illustrates a control block diagram of the spatial database system in accordance with the present invention.

FIG. 2 is a control block diagram of a spatial database system in accordance with the present invention, which includes: a input device 20 where a query condition is input by user; a central processing device 21 which is equipped with a query processor that controls and processes a query condition input at the input device 20; a main memory device 22 where a program, which is freely set up in regard to a control processing signal of the central processing device 21, is stored; an auxialiary memory device 23 where a spatial database of geometric information and libring is stored by the control processing signal of the central processing device 21; and an output device 24 where the query result is produced by the central processing device 21.

Figure 3A:
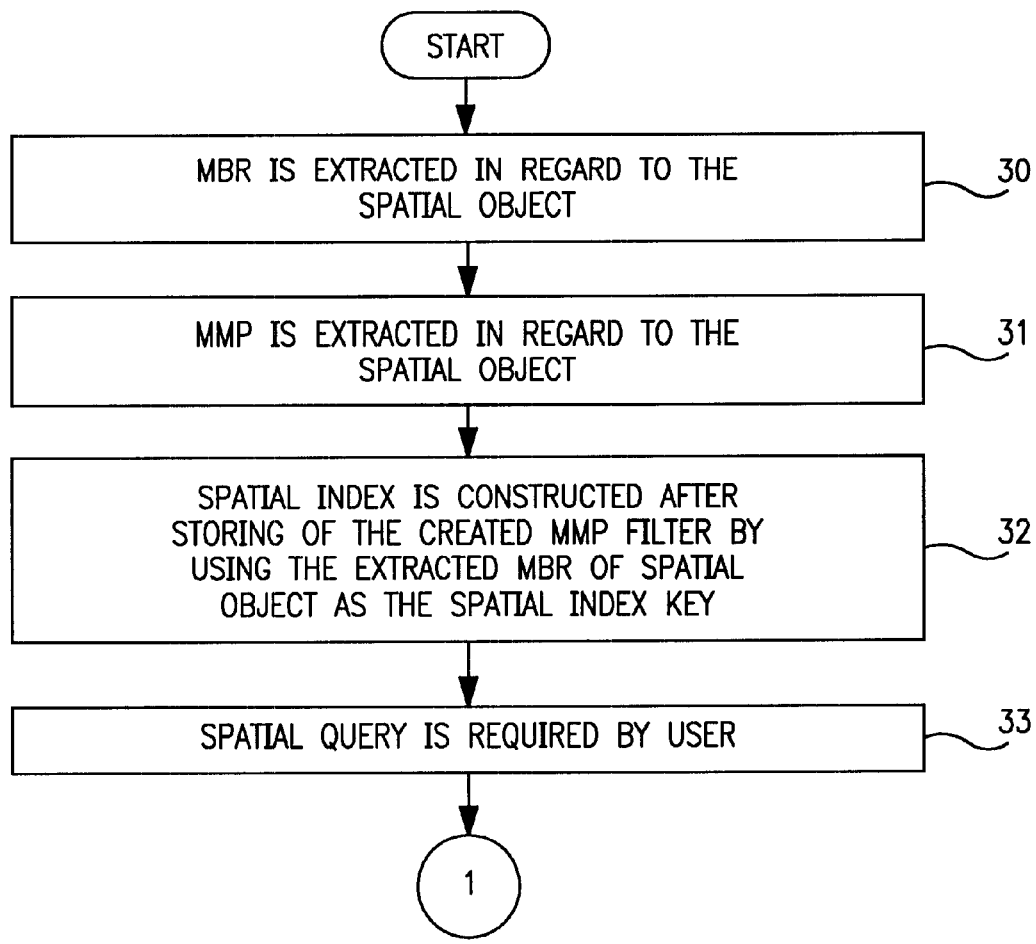
FIGS. 3A–3B are flow charts for a spatial query processing of the spatial database system in accordance with the present invention.
Figure 3B:
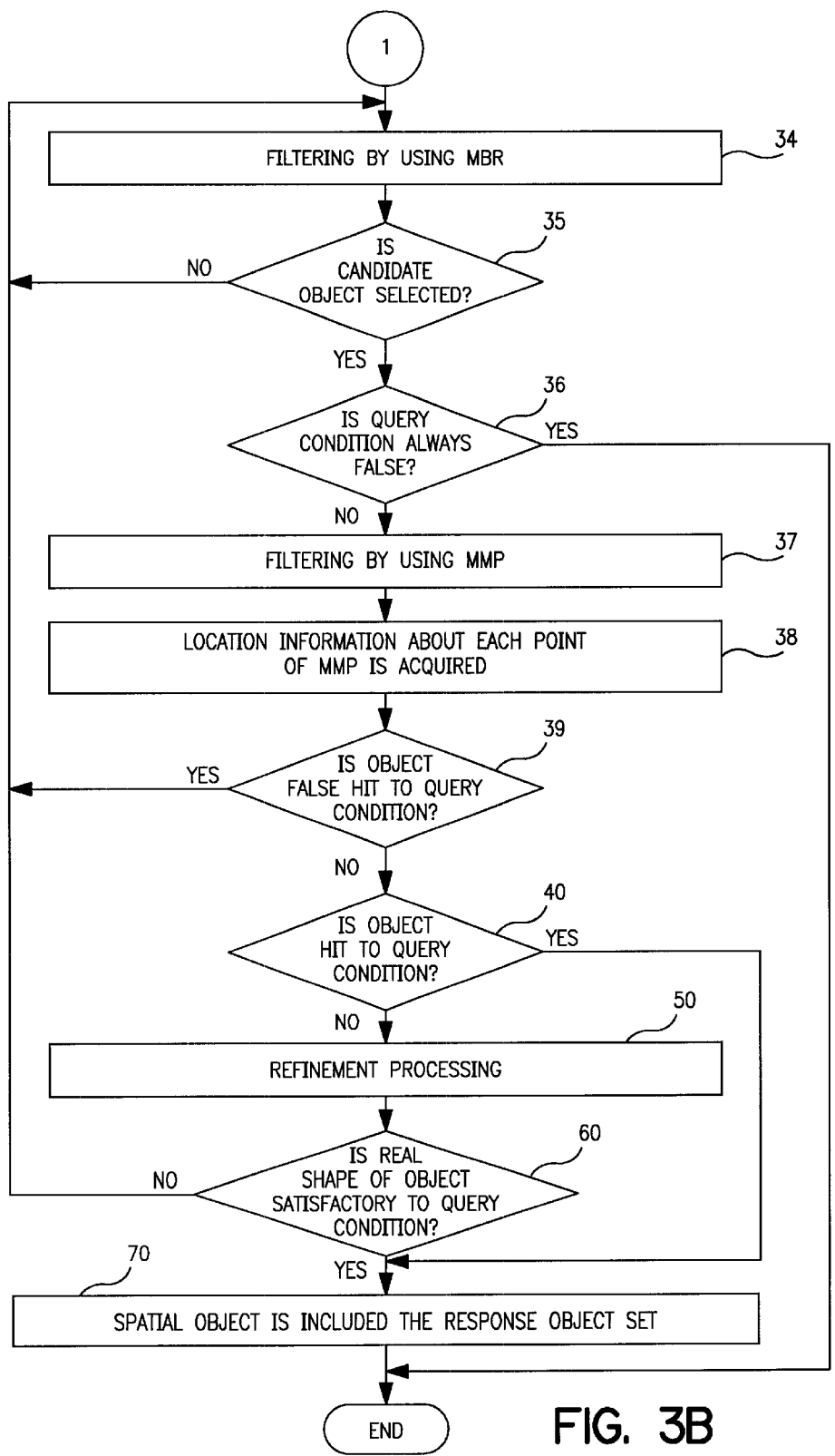

FIG. 3 is a flow chart illustrating a spatial query processing of the spatial database system in accordance with the present invention. At step 30, a minimum bounding rectangle (MBR) is extracted in regard to a spatial object. At step 31, a minimum maximum point (MMP) is created in regared to the spatial object at step 30. At step 32, the spatial index is constructed after a storage of a created minimum maximum point filter by using an extracted spatial object of minimum bounding rectangle of spatial object as a spatial index key. At step 33, a spatial query is required by user in regard to the spatial index key constructed at step 32. At step 34, during filtering by using Minimum Bounding Rectangle, a candidate object satisfying the spatial query is selected by filter processing and comparing the minimum bounding rectangle of the spatial object constructed at step 32 with the minimum bounding rectangle which is extracted in response to the domain object given by the spatial query at step 33. At step 35, it is decided whether the candidate object satisfying the spatial query is selected. At step 36, if the object always satisfactory to the query condition is selected at step 35, it is decided whether the query condition is always false. At step 37, the minimum maximum point filter of the spatial object stored at step 32 is extracted, if the query condition is always false at step 36. At step 38, a location information about each point of the minimum maximum point filter selected at step 37 is acquired in response to the query condition comparing with a given domain object. At step 39, a dissatisfaction (false hit) to the query condition in response to a location information about each point acquired at step 38 is decided. At step 40, if the dissatisfaction to the query condition is not decided, a satisfaction (hit) to the query condition in response to the location information about each point acquired at step 38 is decided. At step 50, the object, of which dissatisfaction or satisfaction to the query condition is not decided at steps 39 and 40, is refined. At step 60, wherein it is decided whether the real shape of the object is satisfactory to the query condition. Finally, at step 70, the object is included in the response object set, if the real shape of object is satisfactory to the query condition; and the object goes back to step 34 and is re-executed again, if the real shape of the object is not satisfactory to the query condition at step 60, or if the object is not satisfactory the query condition at step 40, or if the object is not satisfactory to the query condition at step 39.

The explanation about the operation constituted with the above description in accordance with the present invention will follows. In the spatial database system, the spatial object is searched by spatial query processing using spatial index, and the procedure comprises the below steps. At step 30, the minimum bounding rectangle is extracted from the the spatial object. At step 31, the minimum maximum point filter is created in regard to the spatial object of the extracted minimum maximum bounding rectangle. At step 32, the extracted minimum maximum bounding rectangle is provided to the key of the spatial object, and the spatial index, which is included in the created minimum maximum point filter, is constructed. At step 33, the central processing device 21 is required to demand the spatial query condition through the input device 20. At step 34, the minimum bounding rectangle of the given domain object is extracted in regard to the spatial query condition demanded at step 33 stored at the main memory device 22 by controlling the main memory device 22 at the central processing device 21. The candidate object satisfactory to the spatial query is selected by comparing the extracted minimum bounding rectangle at step 34 with the minimum bounding rectangle constructed at step 32. In response to the choice of the candidate object, it is decided whether the candidate object has been selected in the central processing device 21 at step 35. If a candidate object is not selected by the result of the decision, the minimum bounding rectangle of the given domain object, which is extracted, is maintained at the main memory device 22 by control of the central processing device 21, and the choice of the candidate object satisfactory to the spatial query is repeatedly executed in the central processing device 21. On the other hand, if the candidate object is chosen at step 35, it is decided whether the query condition is always false. That is, when the shape of the spatial object is polygram, circle, ellipse, the query condition is crossover, and when the shape of spatial object is polyline, the query condition is contain, cover, and overlay, in the central processing device 21 at step 36. If the query condition is not always false by the result of the decision, the minimum maximum point filter of the stored spatial object at step 32 is extracted in the central processing device at step 37, and filtering processing is executed by using this minimum maximum filter from step 38 to step 40. If the query condition is always false at step 36, the execution is terminated. At step 38, the location information is acquired about each point of minimum maximum point filter existing on the domain object in response to the spatial query condition demanded at the step 33. The false hit to the query condition is decided at step 39.

If the false hit to the query condition is not decided at step 39, it is decided whether the query condition is hit at step 40. When the query condition is not hit by the result of decision, the real shape of the object, which is not decided whether false hit or hit, is compared with the real shape of the domain object given from the query at step 50. It is decided whether the real shape of object is satisfactory to the query condition at step 33. If not satisfactory to the query condition, the execution is repeatedly performed; on the other hand, if the real shape of object is satisfactory to the query condition, the object is included in the response object set.

If it is decided that the object is false hit to the query condition at step 39, the execution is repeatedly performed at step 34. If it is decided that the query condition is hit at step 40, the object is included in the satisfied object set.

In the above procedure of filter processing using minimum maximum point filter, the query condition is provided as spatial operations, contain, contained, covered overlap, crossover, and touch; if the condition given from 33 is contain spatial operation, each point constituting the minimum maximum point filter is checked to be touch of the domain object; if the touch points exist more than one, it is decided that the query condition is false hit at step 39.

At step 38, when the condition given from step 33 is contained spatial operation, each point constituting the minimum maximum point filter is checked to be contained at the domain object; if contained points are less than the number of the points constituting minimum maximum point filter, it is decided that the query condition is false hit at step 39; if the contained points are the same to the number of points constituting the minimum maximum point filter, it is decided that the query condition is hit at step 40.

At step 38, when the condition given from step 33 is covered spatial operation; if the shape of the domain object given at step 33 is rectangle, it is checked that each point of the minimum maximum point filter is contained. If the number of contained points are the same to the number of points constituting the minimum maximum point filter, it is decided that the query condition is false hit at step 39; when the shape of the domain object from step 33 is polygon, circle, or ellipse except rectangle, it is examined that each point of the minimum maximum point filter is disjointed at the domain object; if the disjointed points exist more than one, it is decided that the query condition is hit at step 39.

At step 38, when the condition given from step 33 is overlap cross spatial operation, and if the shape of the domain object given from step 33 is rectangle, it is checked whether the minimum maximum point filter is disjointed; if at least one of the disjointed points does not exist, it is decided that the query condition is false hit at step 39; when it is not decided that the query condition is false hit, and if the contained points exist more than one, it is decided that that the query condition is hit.

At step 38, when the condition given from step 33 is touch spatial operation, it is checked whether each point constituting the minimum maximum point filter is contained at the domain object; if the contained points exist more than one, it is decided that the query condition is false hit.

As can be seen from the above, the method in accordance with the present invention provides an performance enhancement effect of spatial query processing in the filtering and refinement steps of the spatial database system by filtering many objects at the spatial query filtering step and reducing the time required for the refinement step, by means of applying, to phase related spatial operators used at the spatial database system, multi-step filtering method, wherein the candidate objects filtered by the minimum bounding rectangle surrounding the spatial object are refiltered by minimum maximum point filter, which can be employed in the linear object and areal object and has higher filter ratio than the minimum bounding rectangle.

While the present invention has been described with respect to certain preferred embodiments only, other modifications and variations may be made without departing from the sprit and scope of the present invention as set forth in the following claims.

What is claimed is:

1. A method for multi-step filtering a spatial object in a spatial data system, comprising the steps of:

a) extracting a minimum bounding rectangle (MBR) of a spatial object stored in a spatial database system and constructing a spatial index by using the MBR as a spatial index key;

b) creating minimum maximum points (MMP) of the spatial object;

c) inserting the MMP of the spatial object into the spatial index;

d) receiving a spatial query having a spatial query condition, i.e., a spatial domain object and spatial operations from a user;

e) extracting a minimum bounding rectangle of the spatial domain object, and selecting a candidate object satisfying the spatial query condition by comparing the minimum bounding rectangle of the spatial domain object with the minimum bounding rectangle of the spatial object based on the spatial operations, and executing the step e) for another spatial object if the candidate object satisfactory to the spatial query condition is not selected;

f) determining whether the spatial query condition is always false;

g) extracting minimum maximum points (MMP) of the candidate object, if the spatial query condition is not always false;

h) acquiring location information about each point of the minimum maximum points by comparing the spatial domain object with the MMP of the candidate object based on the spatial operations;

i) determining whether the spatial query condition is always dissatisfied (false hit) based on the location information;

j) determining whether the spatial query condition is always satisfied (hit) based on the location information, if the spatial query condition is the false hit;

k) executing a refinement process for the spatial object, if the spatial query condition is neither the false hit nor the hit;

l) determining whether a real shape of the candidate object is satisfactory to the spatial query condition based on the spatial operations;

m) classifying the candidate object into a response object set, if the real shape of the candidate object is satisfactory to the spatial query condition, or if the candidate object is hit to the spatial query condition, discarding the candidate object if the real shape of the candidate object is not satisfactory to the spatial query condition or if the candidate object is the false hit to the spatial query condition; and n) re-executing from the step e).

2. The method as recited in claim 1, further comprising the step of:

checking whether each point constituting the minimum maximum points is the spatial domain object when the spatial query condition given from step d) is a "contain" spatial operation, and deciding that the spatial query condition is the false hit at step i), if one or more point(s) is touched on the spatial domain object.

3. The method as recited in claim 1, further comprising the steps of:

checking whether each point constituting the minimum maximum points is contained at the spatial domain object when the spatial query condition given from step d) is the "contain" spatial operation;

deciding that the spatial query condition is the false hit at step i), if a number of the contained points is less than a number of the points constituting the minimum maximum points; and deciding that the spatial query condition is the hit at step j), if the number of the contained points are the same as the number of points constituting the minimum maximum points.

4. The method as recited in claim 1, further comprising the steps of:

checking whether each point of the minimum maximum points is contained at the spatial domain object when the spatial query condition given from step d) is a "covered" spatial operation and if a shape of the spatial domain object given from step d) is rectangle;

deciding that the spatial query condition is the false hit at step i), if a number of the contained points is the same as a number of the points constituting the minimum maximum points;

checking whether each point of the minimum maximum points is disjointed at the spatial domain object, when the shape of the spatial domain object given from step d) is a polygon, a circle, or an ellipse; and deciding that the spatial query condition is the false hit at step i), if one or more point(s) is disjointed at the spatial domain.

5. The method as recited in claim 1, further comprising the steps of:

checking whether each point of minimum maximum points is disjointed when the spatial query condition given from step d) is an "overlap" spatial operation and a shape of the spatial domain object is a rectangle;

deciding that the spatial query condition is the false hit at step i), if the disjointed points do not exist;

checking whether each point of the minimum maximum points is contained at the spatial domain object, when it is not decided that the query condition is the false hit at step i) and a number of the disjointed points is less than a number of points constituting the minimum maximum points;

deciding that the spatial query condition is the hit at step j), if one or more point(s) is contained at the spatial domain object;

checking whether each point of the minimum maximum points is disjointed at the spatial domain object when the shape of the spatial domain object given from step d) is a polygon, a circle, or an ellipse;

checking whether each point of the minimum maximum points is contained at the spatial domain object if a number of the disjointed points is one or more point(s) and less than a number of points constituting the minimum maximum points; and deciding that the spatial query condition is the hit at step j), if one or more point(s) is contained at the spatial domain object.

6. The method as recited in claim 1, further comprising the steps of:

checking whether each point of the minimum maximum points is contained at the spatial domain object, when the spatial query condition given from step h) is a "crossover" spatial operation and a shape of the spatial domain object is a rectangle;

deciding that the spatial query condition is the false hit at step i), if there is no contained point;

checking whether each point of the minimum maximum points is disjointed from the spatial domain object, when it is not decided that the spatial query condition is the false hit and one or more than point(s) is contained at the spatial domain object and less than a number of points constituting the minimum maximum points;

deciding that the spatial query condition is the hit at step j), if one or more point(s) is contained at the spatial domain object;

checking whether each point of the minimum maximum points is contained at the spatial domain object when the shape of the spatial domain object given from step d) is a polygon, a circle, or an ellipse;

checking whether each point of the minimum maximum points is disjointed at the spatial domain object if a number of the contained points is one or more point(s) and less than a number of points constituting the minimum maximum points; and deciding that the spatial query condition is the hit at step j), if one or more point(s) is disjoined at the spatial domain object.

7. The method as recited in claim 1, further comprising the steps of:

checking whether each point constituting the minimum maximum points is contained at the spatial domain object when the spatial query condition given from step d) is a "touch" spatial operation, and deciding that the spatial query condition is the false hit at step i), if one or more point(s) is contained at the spatial domain object.

* * * * *